(12) United States Patent
Suzuki

(10) Patent No.: US 7,408,613 B2
(45) Date of Patent: *Aug. 5, 2008

(54) DISPLAY PANEL, LAMINATED SUBSTRATE, LIQUID CRYSTAL CELL AND METHOD OF MANUFACTURING LAMINATED SUBSTRATE

(75) Inventor: Shunji Suzuki, Yokohama (JP)

(73) Assignee: AU Optronics Corporation (TW)

( * ) Notice: Subject to any disclaimer, the term of this patent is extended or adjusted under 35 U.S.C. 154(b) by 13 days.

This patent is subject to a terminal disclaimer.

(21) Appl. No.: 11/456,146

(22) Filed: Jul. 7, 2006

(65) Prior Publication Data

US 2007/0024796 A1 Feb. 1, 2007

Related U.S. Application Data

(62) Division of application No. 10/894,448, filed on Jul. 19, 2004, now Pat. No. 7,081,940, which is a division of application No. 10/121,462, filed on Apr. 11, 2002, now Pat. No. 6,795,153.

(30) Foreign Application Priority Data

Apr. 18, 2001 (JP) ............................. 2001-120039

(51) Int. Cl.
*G02F 1/1339* (2006.01)
(52) U.S. Cl. .................................... 349/153
(58) Field of Classification Search ................. 349/153
See application file for complete search history.

(56) References Cited

U.S. PATENT DOCUMENTS

| | | | |
|---|---|---|---|
| 5,684,555 A * | 11/1997 | Shiba et al. .................. 349/149 |
| 5,742,006 A | 4/1998 | Grupp et al. |
| 5,828,435 A | 10/1998 | Kato et al. |
| 5,838,482 A | 11/1998 | Decroupet et al. |
| 5,887,236 A | 3/1999 | Hirao et al. |
| 5,929,959 A | 7/1999 | Iida et al. |
| 5,982,470 A * | 11/1999 | Nakahara et al. ............ 349/153 |
| 6,013,339 A | 1/2000 | Yamada et al. |
| 6,057,898 A | 5/2000 | Itoh et al. |
| 6,124,917 A | 9/2000 | Fujioka et al. |
| 6,259,505 B1 | 7/2001 | Makino |
| 6,317,186 B1 | 11/2001 | Miwa et al. |
| 6,456,355 B1 | 9/2002 | Choi et al. |
| 6,744,484 B1 * | 6/2004 | Yoshino et al. ............. 349/153 |
| 2002/0196393 A1 | 12/2002 | Tashiro et al. |

FOREIGN PATENT DOCUMENTS

| | | |
|---|---|---|
| JP | 52045947 A | 4/1977 |
| JP | 4020929 A | 1/1992 |
| JP | 2000-193989 | 7/2000 |

* cited by examiner

*Primary Examiner*—James A Dudek
(74) *Attorney, Agent, or Firm*—John A. Merecki; Hoffman Warnick LLC

(57) ABSTRACT

A display panel, laminated substrate, and liquid crystal cell which includes a pair of facing substrates bonded together with a sealing material. One or both of the substrates includes at least one corner portion on which a plurality of protruding pads are formed, the pads assisting in dispersion of the sealing material during bonding of the substrates to prevent sealing material from moving inwardly and possibly adversely affecting the display region of the resulting structure. A method of making such a laminated substrate is also provided.

6 Claims, 20 Drawing Sheets

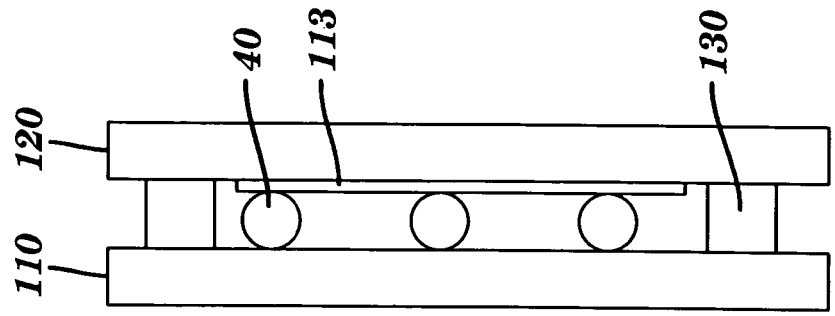
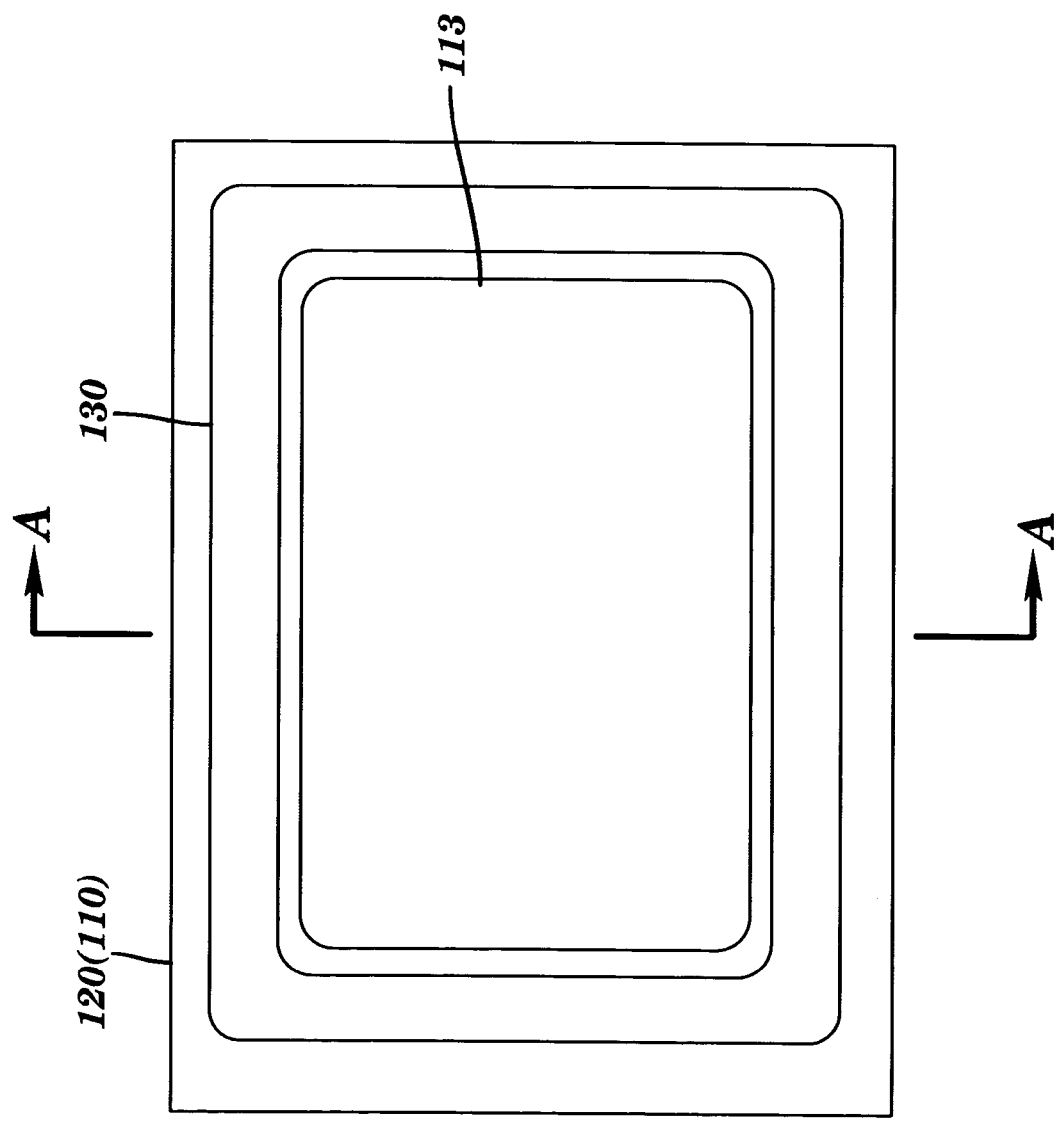

US 7,408,613 B2

DISPLAY PANEL, LAMINATED SUBSTRATE, LIQUID CRYSTAL CELL AND METHOD OF MANUFACTURING LAMINATED SUBSTRATE

CROSS-REFERENCE TO RELATED APPLICATIONS

This application is a Divisional application of patent application 10/894,448, filed Jul. 19, 2004 now U.S. Pat. No. 7,081,940, entitled "Display Panel, Laminated Substrate, Liquid Crystal Cell and Method of Manufacturing Laminated Substrate," which is a Divisional application of patent application Ser. No. 10/121,462, filed Apr. 11, 2002 now U.S. Pat. No. 6,795,153, entitled "Display Panel, Laminated Substrate, Liquid Crystal Cell and Method of Manufacturing Laminated Substrate," now U.S. Pat. No. 6,795,153.

BACKGROUND OF THE INVENTION

The present invention relates to a display panel as represented by a liquid crystal cell, more specifically to a technology suitable for obtaining a narrow-frame liquid crystal display panel.

Liquid crystal display devices are remarkably widespread as image display devices for personal computers and various other monitors. Typical liquid crystal display devices of this kind include a backlight, which is a planar light source for illumination, that is provided on a back side of the liquid crystal cell such that the backlight irradiates a liquid crystal layer having predetermined expansion to even brightness as a whole, whereby images formed on the liquid crystal layer are visualized.

The liquid crystal cell is comprised of two glass substrates being laminated together via the liquid crystal layer. Surrounding portions of the two glass substrates are sealed with a sealing material, and a liquid crystal material is filled into a space between the two glass substrates and surrounded by the sealing material, whereby a liquid crystal layer is formed. While a part of the liquid crystal cell surrounded by the sealing material constitutes a display area, the part provided with the sealing material does not constitute the display area, but instead is referred to as a frame. Because it is desirable to obtain a wide display area for the resulting structure, the width of the frame should be made as narrow as possible, but still able to function as required.

FIGS. 16(a) to 16(c) are views showing a conventional liquid cell, wherein FIG. 16(a) is a plan view thereof; FIG. 16(b) is a cross-sectional view taken along line A-A in FIG. 16(a); and FIG. 16(c) is an enlarged, partial view of a corner portion of the liquid crystal cell in FIGS. 16(a) and 16(b).

In FIGS. 16(a) to 16(c), a first substrate 110 is shown and consists of a flat hard glass. The major part of the top surface of first substrate 110 is occupied by a display area 113 having a colored layer composed of color filters (CF) of red, green and blue (RGB) formed therein. A sealing material 130 is applied thereto along the perimeter of display area 113 of first substrate 110. Small spacers 40 are positioned over display area 113 in order to maintain a uniform thickness of the liquid crystal cell over the whole surface. A second substrate 120 is also shown, and also consists of a hard glass. It is provided with thin-film transistors (TFTs) on its surface opposite to first substrate 110. When second substrate 120 is stacked on first substrate 110, the applied sealing material 130 is pressed to adhere the two substrates 110 and 120 together. When these two substrates are adhered together, both are then subjected to a baking step (a thermal treatment), such that sealing material (e.g. epoxy resin) 130 is cured, whereby first substrate 110 and second substrate 120 are finally sealed together to form the liquid crystal cell. A liquid crystal material is filled into the liquid crystal cell thus formed, through an insertion port formed within sealing material 130, whereby an end product now results. The sealing material is then finally sealed.

In FIG. 16(c), sealing material 130 is applied as illustrated by solid lines 138. However, when the sealing material is pressed by laminating the first and second substrates, it spreads as illustrated by dotted lines 139. Here, when sealing material 130 spreads toward the inside of first substrate 110, it may penetrate display area 113 partially. If it does penetrate as such, it may cause display defects on the corners of display area 113. To avoid such penetration, it is necessary to distance the corners of display area 113 from an inner edge of sealing material 130. As such, the space between the display area 113 and the inner edge of sealing material 130 must be relatively broad. Therefore, the outermost edges of display area 113 are limited and not readily expandable if a larger area is desired.

Various modes of attempts to achieve frame narrowing by controlling the behavior of the applied sealing materials are defined in Japanese Patent Laid-Open Publication No. 2000-193989 (and its USA counterpart U.S. Pat. No. 6,317,186 B1), both assigned to the same assignee as the present invention. These modes inhibit sealing material spread at corner portions of the liquid crystal cell. According to conventional methods (prior to those taught in Japanese Patent Laid-Open Publication No. 2000-193989 and U.S. Pat. No. 6,317,186 B1), a sealing material applied at a corner portion of a liquid crystal cell tended to spread inward, i.e. toward the display area, during laminating of the two glass substrates, and thus the display area was reduced. The various modes defined in Japanese Patent Laid-Open Publication No. 2000-193989 and U.S. Pat. No. 6,317,186 B1, are intended to prevent such spread.

One such mode is illustrated in FIG. 17. Here, protruding (upstanding or upraised) portions 140 are provided on a glass substrate cell except at the corner portions thereof. These are along the top and side (as well as the bottom and opposing side, not shown) edges, as seen. As a result, a step is formed in the vicinity of the perimeter of the second substrate (120 in FIG. 16(a)) in a manner that upper surfaces of the corner portions are lower than the upper surfaces of protruding portions 140. Sealing material 130 applied in the vicinity of the perimeters of the second substrate show less height at the corner portion, which is lower by the height of protruding portion 140. Sealing material 130 at the corner portion is pressed less than the sealing material at protruding portion 140 during substrate lamination, by the amount equivalent to the height of the protruding portion. On the other hand, sealing material 130 applied over portions 140 is more pressed by the amount equivalent to the volume of the respective protruding portion. In other words, this mode modifies the inside edge of sealing material 130 at the corner portion from an arc (FIG. 16(c)) to an approximate right angle by using this difference of pressed sealing material at the corner portion versus that in other regions (sides).

Another mode defined in Japanese Patent Laid-Open Publication No. 2000-193989 and U.S. Pat. No. 6,317,186 B1 is illustrated in FIG. 18. This is an example of providing a protruding (upstanding or upraised) portion 150 having rectangular planes at the corner portions of second substrate 120, so that a pressed amount of sealing material 130 is directed outwardly (from the display area 113) toward the substrate's corners. Portion 150 is formed at the corner portion to coincide with a diagonal through the center of the liquid crystal cell. Sealing material 130 on an upper surface of the protruding portion is more pressed by second substrate 120. Since sealing material 130 is applied thereto in a shape as illustrated in FIG. 18, the inside edge of the sealing material at the corner forms an approximate right angle, due to the increase in pressure on the sealing material 130 at protruding portion 150.

When a sealing material is applied with a dispenser, the traveling speed of the dispenser along the outer regions of the substrates needs to be slowed down at the corner portions. Assuming that an amount of sealant discharge per unit of time is maintained constant, the amount of sealing material applied in the corner portion is increased. As a consequence, although the mode shown in FIG. 17 provides certain advantages, further improvement is required in order to sufficiently inhibit sealing material 130 at the corner portion from spreading inward. In the mode shown in FIG. 18, the dispenser must move along a special trajectory at the corner portions during application of sealing material. That is, the trajectory of the dispenser becomes longer and more complex than the example shown in FIG. 17. This added complexity is, obviously, not desirable from a manufacturing standpoint.

Japanese Published Unexamined Patent Application 4-20929 discloses a liquid crystal cell in which an uneven portion is formed along peripheral portion of each of two substrates, a sealing material is applied on the uneven portion, and the two substrates are faced to each other and sealed. By providing the uneven portion on the portions on which the sealing material is applied, a strong adhesive strength is obtained, a penetration of water component into the liquid crystal cell is suppressed, and a reliability of a display panel is guaranteed.

Japanese Published Unexamined Patent Application 52-45947 discloses a technology for forming a groove along a peripheral edge of one of glass substrates of a liquid crystal cell. In a process for sealing the two glass substrates, an excess sealing material flows into the groove, so that a straight edge of the sealing material facing to a display area without an undesired wave like shape is realized. Since the edge of the sealing material facing to the display area is a straight line, a product value of the liquid crystal display panel is increased.

These documents, however, do not teach an improved method for applying the sealing material onto the corner regions of the substrate.

It is believed, therefore, that a method which assures precise sealing material spread relative to the display (viewable) area of such a cell in an improved manner over methods described hereinabove would represent a significant advancement in the art.

OBJECTS AND SUMMARY OF THE INVENTION

Accordingly, it is a primary object of the present invention to provide a method of making a display panel which controls spread of a sealing material more efficiently, especially at the corners of the panel.

Another object of the present invention is to provide a display panel made in accordance with such a method.

Still another object of the invention is to provide such a method which can be completed in a facile manner, resulting in a cost savings for the final cell product compared to some known products.

According to one aspect of the invention, there is provided a display panel comprising a first substrate having an image display area and at least one corner portion, a second substrate disposed opposite to the first substrate with a space provided therebetween, the second substrate also having at least one corner portion located adjacent the corner portion of the first substrate, sealing material disposed along the perimeter of the image display area for joining the first substrate and the second substrate, the sealing material and the space defining a region between the first and second substrate, an image display material located within the region defined by the space and the sealing material, and a plurality of pads positioned on the corner portion of the first substrate and/or the second substrate, or forming a part thereof, the pads facing the image display material and oriented in a substantially radial pattern within the corner portion.

According to another aspect of the invention, there is provided a laminated substrate comprising a substantially rectangular first substrate having a perimeter, a substantially rectangular second substrate disposed opposite to the first substrate with a space provided therebetween, sealing material of a frame shape disposed along the perimeter of the first substrate for bonding the first and second substrates, the sealing material having linear edge portions and corner portions for connecting the linear edge portions, a plurality of first pads positioned on the substantially rectangular first substrate relative to the linear edge portions of the sealing material, and a plurality of second pads positioned on the first substrate relative to the corner portion of the sealing material and oriented in a substantially radial pattern within the corner portion.

According to a third aspect of the invention, there is provided a liquid crystal cell comprising a substantially rectangular first substrate having a color filter layer and four corner portions, a substantially rectangular second substrate being disposed opposite to the first substrate and having driver elements for liquid crystal materials, a sealing material of a frame shape for joining the first substrate and the second substrate, and a plurality of pads positioned on each of the corner portions of the first substrate or forming a part of the first substrate, the pads oriented in a substantially radial pattern in the corner portions.

According to a fourth aspect of the invention, there is provided a method of manufacturing (making) a laminated substrate having substantially rectangular first and second substrates, the method comprising providing a first substrate having corner portions and a perimeter, providing a second substrate and positioning the second substrate adjacent the first substrate to define a space therebetween, forming a plurality of pads at each of the corner portions of the first substrate on a surface facing the second substrate, such that the pads in each of the corner portions are oriented in a substantially radial pattern, applying a sealing material onto the first substrate having the plurality of pads formed thereon, the sealing material being applied along the perimeter of the first substrate on the facing surface and on the plurality of pads, laminating the first substrate and the second substrate together, and substantially curing the sealing material to join the first substrate and the second substrate,

BRIEF DESCRIPTION OF THE DRAWINGS

For a more complete understanding of the present invention and the advantages thereof, reference is now made to the following description taken in conjunction with the accompanying drawings, in which:

FIGS. 16(a) to 16(c), 17 and 18 are views showing a conventional liquid crystal cell.

BEST MODE FOR CARRYING OUT THE INVENTION

Figure 1B:
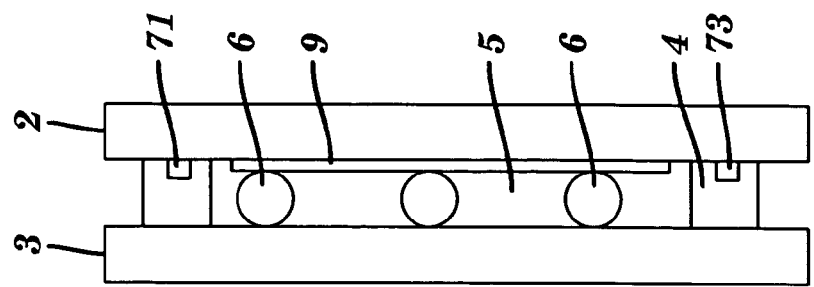
FIGS. 1(a) to 1(c) are views showing a liquid crystal cell according to one embodiment of the present invention.

For a better understanding of the present invention, together with other and further objects, advantages and capabilities thereof, reference is made to the following disclosure and appended claims in connection with the above-described drawings. It is understood that like numerals may be used to indicate like elements from FIG. to FIG.

In order to inhibit a sealing material from spreading inward at the corner portion, the inventors of the present invention have studied structures showing behavior of sealing material as it spreads toward such corner portions. Specifically, the inventors have focused on controlling the behavior by use of surface tension. In other words, a liquid to be applied to a protruding portion having a given area on its upper surface has a characteristic attributable to its surface tension that causes it to spread over the upper surface of the protruding portion but it does not easily fall off this portion. One of the characteristics of the present invention is to form a radial protruding portion at a corner portion of a liquid crystal cell by use of the foregoing characteristic, such that the sealing material applied prior to laminating the two substrates spreads toward the outside of the corner portion. Accordingly, in one embodiment of the present invention, the sealing material forms a frame shape composed of linear edge regions and corner regions for connecting the edge regions, and the plurality of pads are radially disposed at the corner regions of the sealing material.

The display panel of the present invention may also include a plurality of pads to be disposed radially in the corner regions of the sealing material. Even in the case where the sealing material is only partially applied to these pads, the sealing material spreads over upper surfaces of the pads if the viscosity of the sealing material is relatively low. In other words, by forming the pads so as to reach the outside of the corner regions, the sealing material can be spread primarily toward the outside. Accordingly, the sealing material is inhibited from spreading inward. It should be noted that the pads can be formed either on the first substrate or the second substrate, or on both substrates.

In the display panel of one embodiment of the present invention, the sealing material surrounds the plurality of pads disposed radially at the corner regions. In this display panel, the pads can also be built in during the process of fabricating the first substrate and/or the second substrate. In such a case, the integral pads are composed of the same material as the first and/or second substrate.

Application of the present invention is not limited to display panels, as it is widely applicable to structures composed of two substrates joined with a sealing material. Accordingly, the present invention provides a laminated product composed of a first and second substrate joined together with such sealing material.

In the laminated substrate of the present invention, the defined first pads include inner peripheries located inside the laminated substrate and outer peripheries opposite the inner peripheries in the edge regions. The second pads include inner edges located inside the laminated substrate and outer edges opposite to the inner edges in the corner regions. Moreover, if W is the width of a first pad representing a distance from the inner periphery to the outer periphery, and L is the length of the second pad representing a distance from the inner edge to the outer edge thereof, L is preferably greater than W. In this case, it is desirable that the second pad is disposed such that the outer edge is located more outward than the outer periphery of the first pad. More detailed explanation is provided hereinbelow.

The liquid crystal cell according to one embodiment of the present invention forms the plurality of protruding structures extending at least partly along the direction of the diagonal of the cell's first substrate. Similarly to the above-described pads, such protruding structures cause the sealing material to spread toward the outside of the corner portions. In such a liquid crystal cell, the cell's color filter layer can be formed using colored films at positions where the protruding structures are to be placed, and by patterning these appropriately. In this case, the protruding structures are composed of the same material as the colored films, and, according to this embodiment, are preferably cubic. However, without limitations to the foregoing, various other shapes can also be used successfully.

The present invention also provides a method for fabricating the above display panel, laminated substrates and liquid crystal cells as defined herein. In this method, the sealing material is preferably an epoxy resin. Although epoxy resin initially possesses relatively high viscosity, such viscosity can be reduced by subjecting the epoxy resin to a so-called pre-baking step. Accordingly, the sealing material made of epoxy resin can be spread on the whole surfaces of the invention's pads and then subjected to such a pre-baking treatment prior to lamination of the substrates.

One purpose of the laminated substrate of the present invention is to serve as a display panel, one embodiment thereof being a liquid crystal cell. Accordingly, when the first substrate includes an image display area and the first and second substrates are laminated, the resulting structure may function as a display panel. Moreover, when the first substrate includes a color filer layer and the second substrate includes diver elements for liquid crystal materials, the laminated substrate may function as a liquid crystal cell.

Figure 1A:
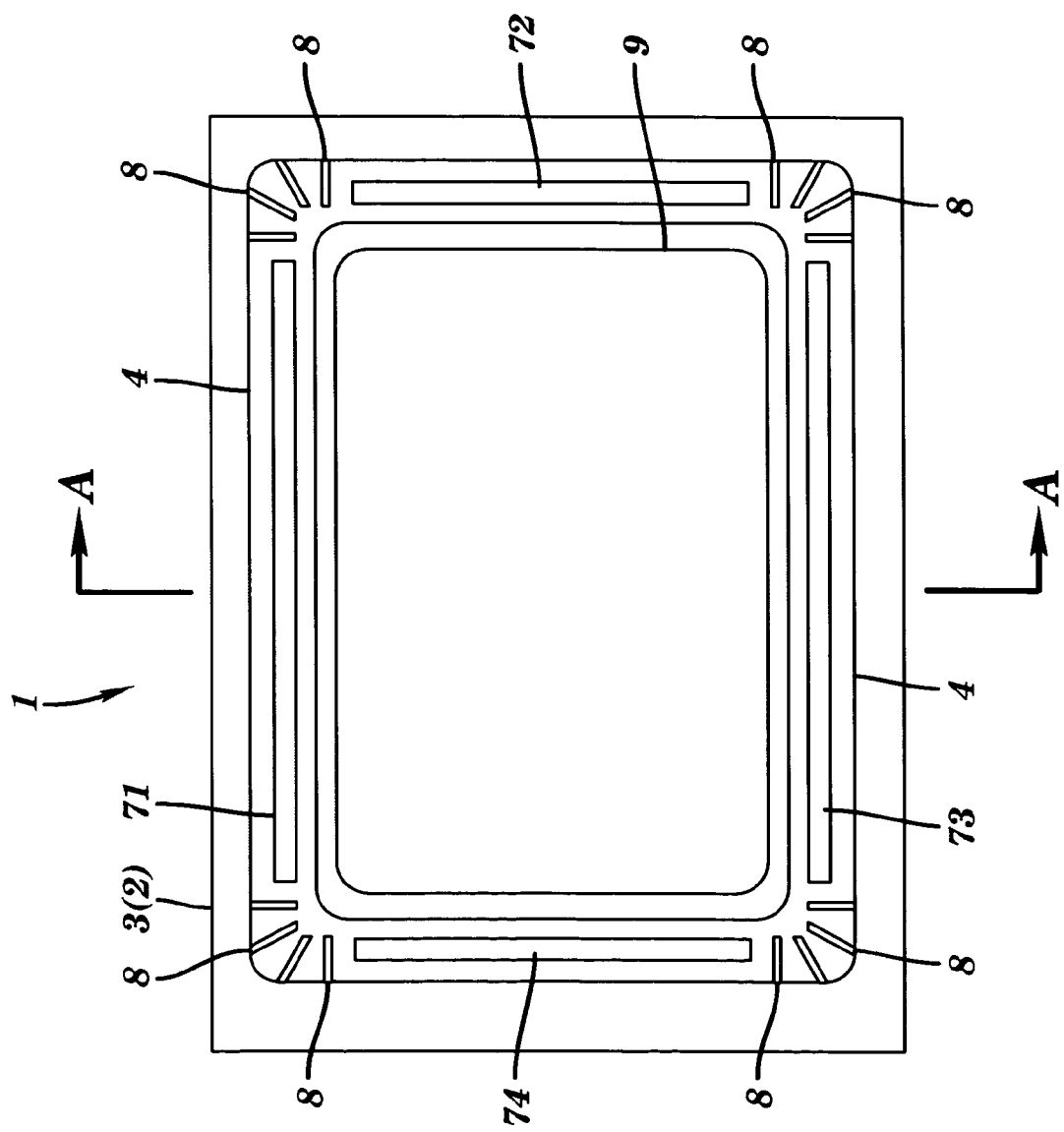
Figure 1C:
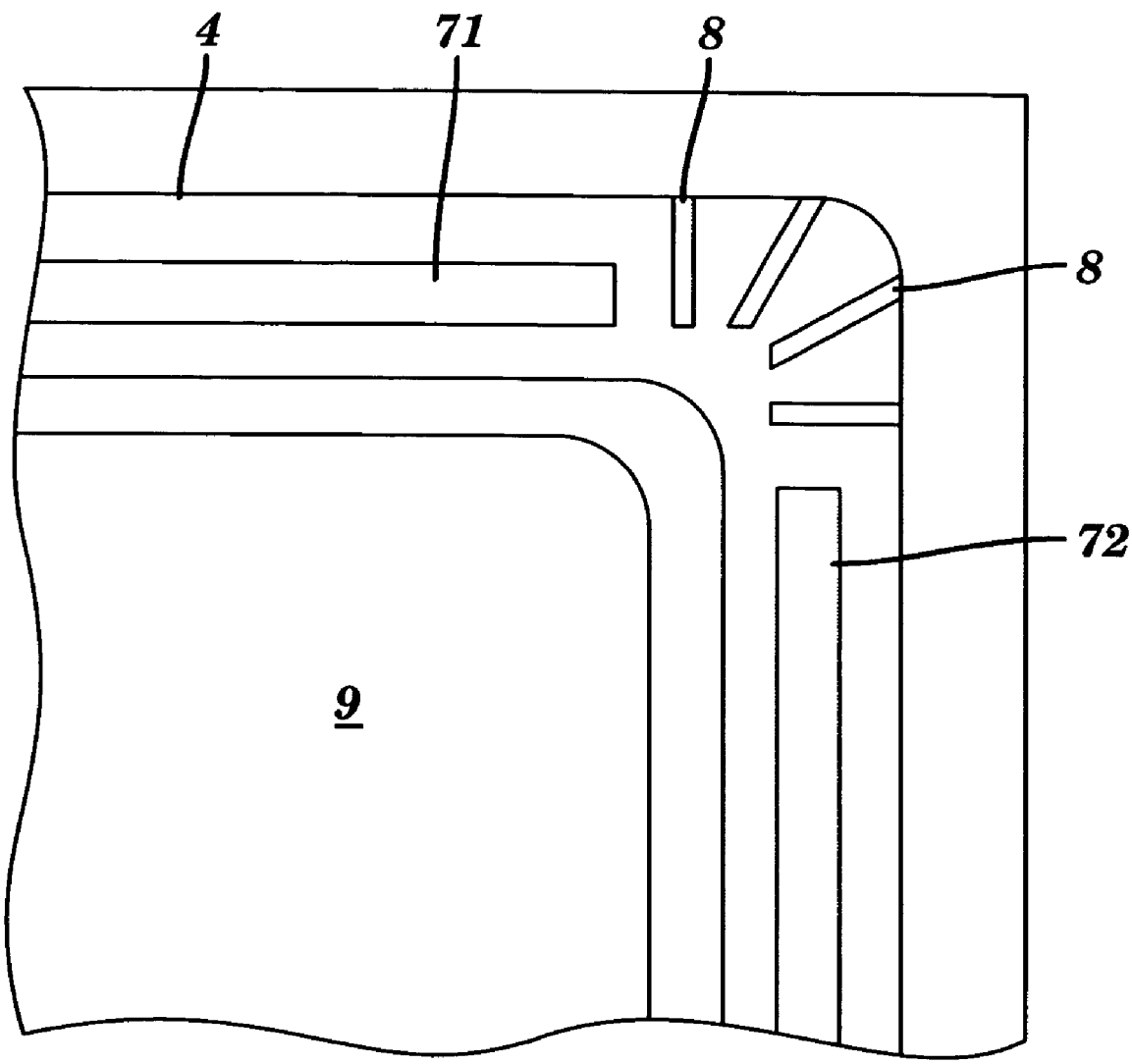

FIGS. 1(a) to 1(c) are views showing a structure of a liquid crystal cell 1 according to an embodiment of the present invention, wherein FIG. 1(a) is a plan thereof, FIG. 1(b) is a cross-sectional view of the cell in FIG. 1(a) as taken along line A-A, and FIG. 1(c) is an enlarged view of a corner portion of liquid crystal cell 1.

Liquid crystal cell 1 is composed of a color filter substrate 2 (being a first substrate) and a TFT array substrate 3 (being a second substrate). Color filter substrate 2 is preferably formed by serially laminating on its surface facing TFT array substrate 3, a color filter composed of colored films containing dyes or pigments of three primary colors of red (R), green (G) and blue (B), a black matrix as a light-shielding film being disposed between pixels of the color filter, a protective film comprised of resin (for protecting the color filter and the black matrix), a common electrode comprised of a transparent conductive thin film of indium tin oxide (ITO), and an alignment film comprised of a polyimide thin film for aligning the liquid crystal materials. These films are known in the art and are not, therefore, illustrated in detail or otherwise in FIGS. 1(a)-1(c). On the other hand, TFT array substrate 3 is preferably made by forming on its surface facing color filter substrate 2, a display electrode comprised of ITO for displaying, thin-film transistors (TFTs) as switching elements for driving the liquid crystal, and storage capacitors as signal retaining capacitors for active matrix operations. Color filter substrate 2 and TFT array substrate 3 are joined together by a sealing material 4, which is preferably comprised of epoxy resin. A liquid crystal material as an image display element material is filled between color filter substrate 2 and TFT array substrate 3 to form liquid crystal layer 5. In addition, spacers 6 are dispersed in order to maintain a constant, uniform gap between color filter substrate 2 and TFT array substrate 3. Color filter substrate 2 and TFT array substrate 3 are joined at the perimeters thereof, by sealing material 4, which, obviously, functions also as an adhesive. The central region surrounded by sealing material 4 comprises the cell's image display area 9. In image display area 9 are disposed the spacers 6 for maintaining the aforementioned gap between color filter substrate 2 and TFT array substrate 3. In other words, the spacers define the thickness of liquid crystal layer 5 (a cell gap). Silica ($SiO_2$) or resin particles are preferably used as spacers 6. Since the cell gap of the color TFT liquid crystal display device is preferably set either in a range of from about 3 to 5 micrometers (or a range not exceeding 5 micrometers), spacers 6 have diameters from about 3 to 5 micrometers (or sizes not exceeding 5 micrometers). Recently, columns (not shown) functioning as spacers 6 may be also formed either on color filter substrate 2 and/or on TFT array substrate 3 by a photolithography process.

On the surface of color filter substrate 2 that faces liquid crystal layer 5, longitudinal first pads 71 to 74 and second pads 8 are formed in an desired pattern. First pads 71 to 74 are formed along four edges of color filter substrate 2, except at its corner portions. Widths (the narrower dimension) of first pads 71 to 74 are desirably selected within a range from about 200 to 300 micrometers. The second pads 8, as shown, are formed at the four corner portions of color filter substrate 2. Four pads 8 are preferably formed per corner portion of color filter substrate 2, these pads 8 forming a radial formation as shown. Second pads 8 are upwardly protruding structures extending almost along the direction of diagonals of color filter substrate 2. The widths (narrower dimension) of second pads 8 are desirably selected within a range from about 20 to 50 micrometers (compared to the aforementioned 200-300 micrometers for pads 71-74). Lengths are desirably selected within a range of from about 1 to 5 millimeters. In addition, the heights of first pads 71 to 74 and second pads 8 should be the same, preferably between about only 1 to 2 micrometers, compared to the gap between color filter substrate 2 and TFT array substrate 3 (less than about 5 micrometers). Inner edge portions of second pads 8 as seen more clearly in FIG. 1(c), are aligned with the inner edge of an adjacent pad 71-74, in a paired orientation. That is, the two pads 8 immediately above pad 72 in FIG. 1(c) align with the inner edge of pad 72, while the remaining two pads 8 align with the inner edge of pad 71.

It is desirable that pads 8 and 71-74 are formed simultaneously with formation of the color filter on color filter substrate 2. This is not limitive of the invention, however, as other methods of forming these members are possible. While the color filter is normally formed in image display area 9, a colored layer which forms the color filter can be also formed in regions where first pads 71 to 74 and second pads 8 are also formed, the colored layer then subjected to appropriate patterning. First pads 71 to 74 and second pads 8 can thus be formed. If so formed, first pads 71 to 74 and second pads 8 are composed of the same material as a colored film. This mode has an advantage that no new processes need to be introduced for forming the invention's pads.

Figure 2:
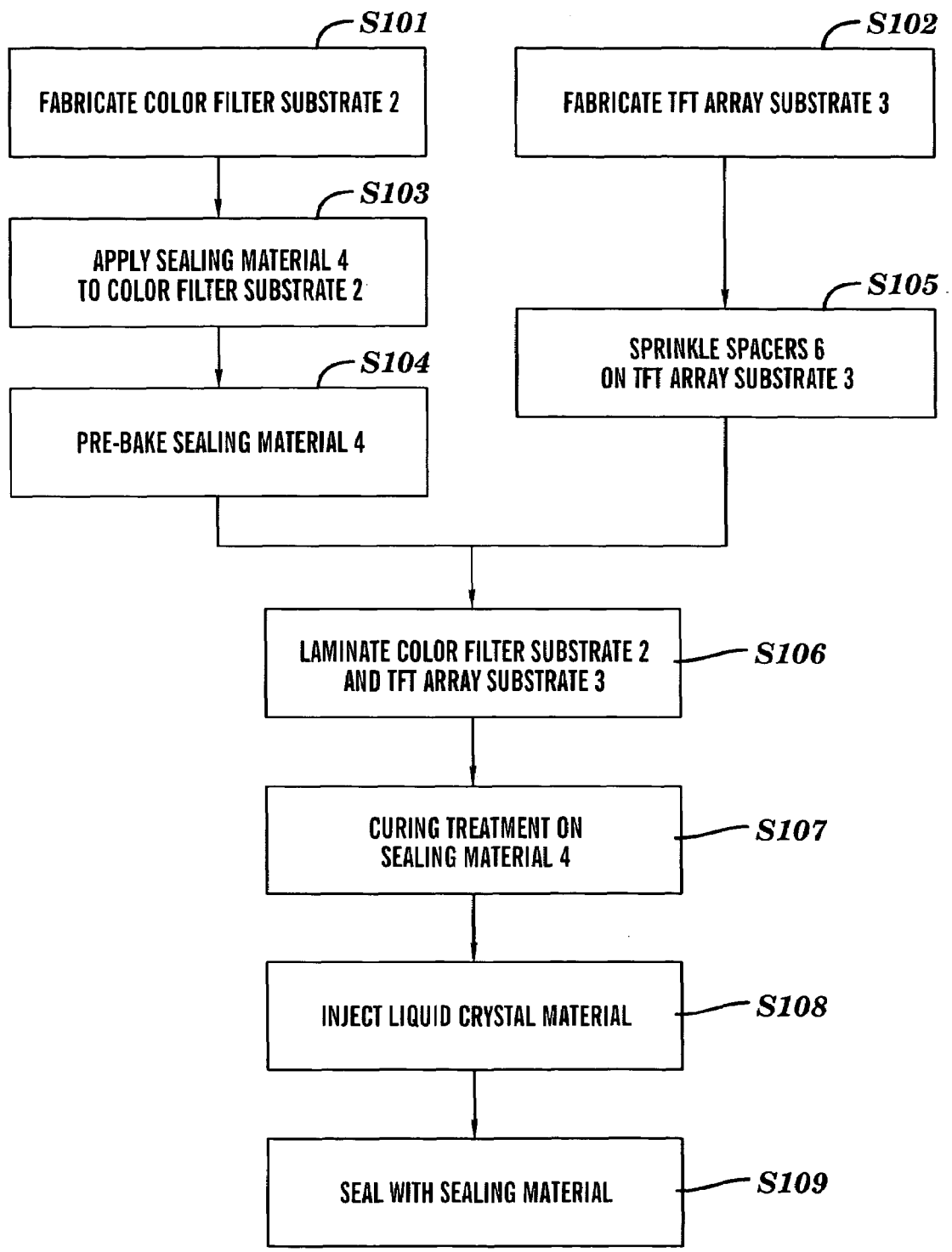
FIG. 2 is a flowchart showing steps for making a liquid crystal cell according to one embodiment of the invention.

The method of manufacturing liquid crystal cell 1 will now be described with reference to FIGS. 2 to 4(b). As shown therein, color filter substrate 2 and TFT array substrate 3 are separately fabricated (FIG. 2, S101 and S102). Manufacturing of color filter substrate 2 and TFT array substrate 3 can be achieved with conventional processes; however, as stated above, first pads 71 to 74 and second pads 8 are formed on color filter substrate 2 in S101. Moreover, alignment treatments (known) are carried out on color filter substrate 2 and TFT array substrate 3 to form alignment films thereon, following which both substrates are subjected to known rubbing treatments.

Figure 3A:
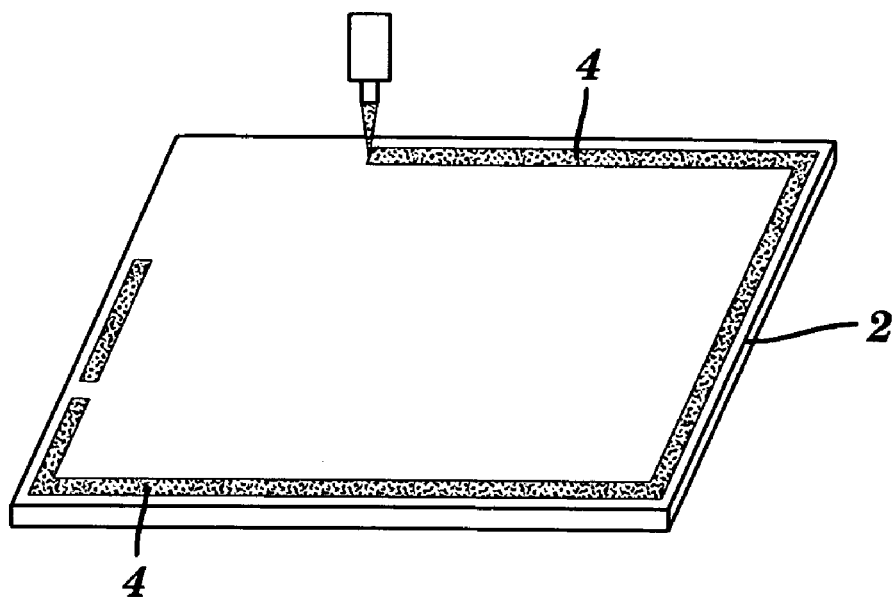
FIGS. 3(a) and 3(b) are views showing some of the manufacturing steps of making a liquid crystal cell according to one embodiment of the invention.

Next, sealing material 4 is applied substantially about the entire perimeter of color filter substrate 2 in a frame shape (FIG. 2, S103) as illustrated in FIG. 3(a). As previously mentioned, ultraviolet-curing resin or thermosetting resin may be used as sealing material 4. (Thermosetting epoxy resin is preferably used in this particular embodiment.) Sealing material 4 is applied thereto, except for a portion for the LC (liquid crystal) injection port of the liquid crystal material (the relatively small open space shown in the left side of substrate 2). After sealing material 4 is applied, material is subjected to pre-baking (FIG. 2, S104). The pre-baking aims at evaporating solvents contained in the sealing material 4 and at removing any bubbles which might have formed. The viscosity of sealing material 4 is reduced after pre-baking. A preferred heating temperature for pre-baking is in a range between about 70 to 90 degrees Celsius.

Figure 3B:
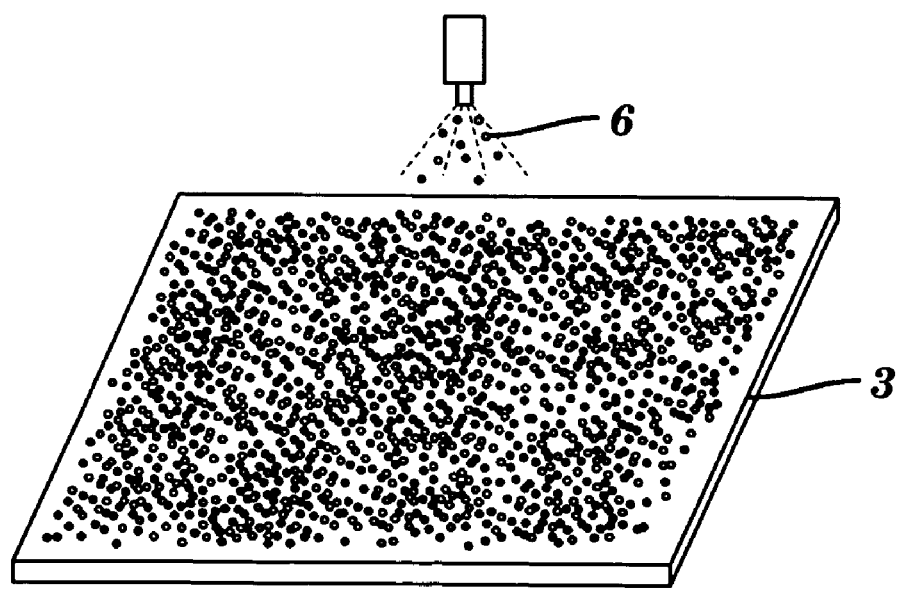
Figure 4A:
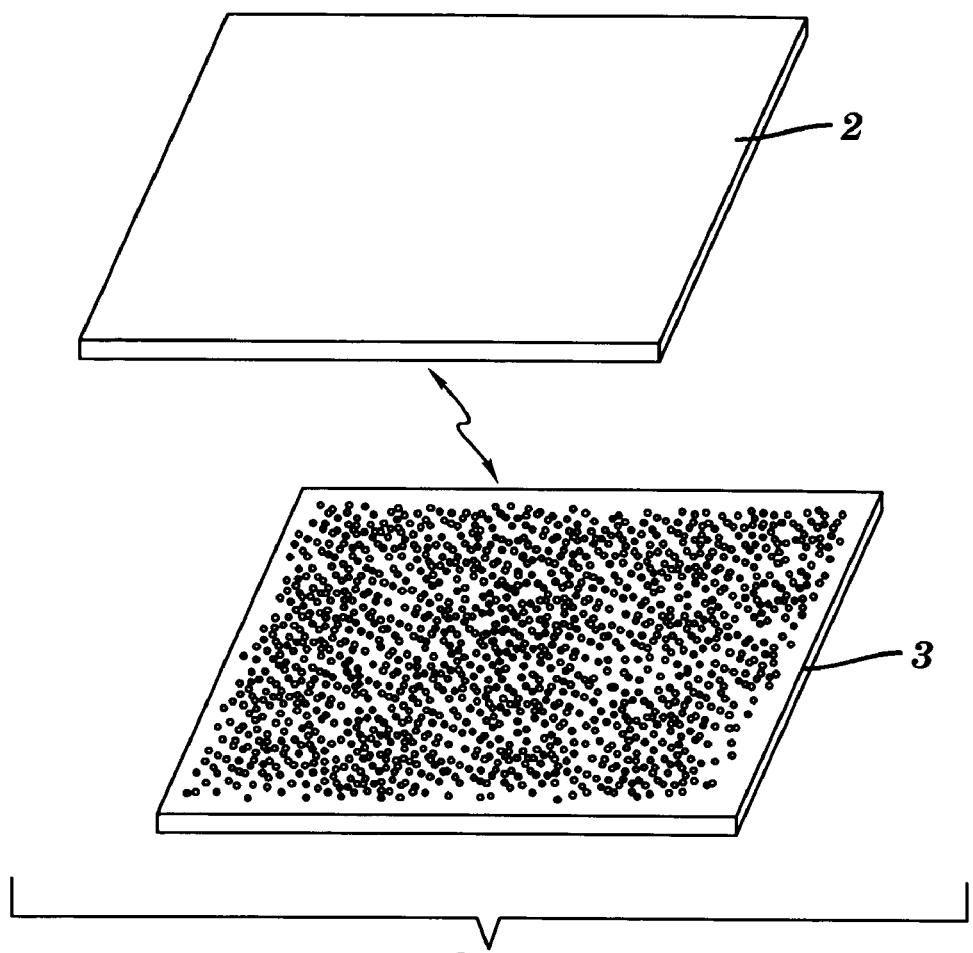
FIGS. 4(a) and 4(b) are views showing further manufacturing steps of making a liquid crystal cell according to one embodiment of the invention.
Figure 4B:
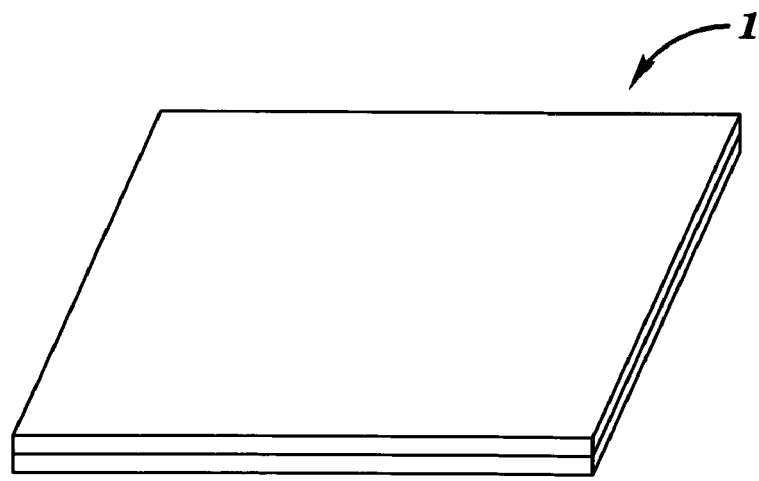

Meanwhile, spacers 6 are sprayed onto TFT array substrate 3 (FIG. 2, S105), as seen in FIG. 3(b). After spraying, color filter substrate 2 is stacked on TFT array substrate 3, thus obtaining a lamination (FIG. 2, S106), as depicted in FIGS. 4(a) and 4(b). As a result, sealing material 4 is pressed. Sealing material 4 is then subjected to a curing treatment (FIG. 2, S107). The curing treatment involves heating the laminated subassembly in FIG. 4(b) to a temperature of between about 120 to about 200 degrees Celsius, this step referred to as a baking step (compare to the pre-baking step defined above). After the curing of sealing material 4 is completed, the desired liquid crystal material is injected (FIG. 2, S108). A known vacuum injection method is generally adopted for injection of the liquid crystal material. As a result, the gap between the two substrates is compressed (by putting the laminated subassembly in a vacuum chamber), and, while in that state, the LC injection port is dipped into the liquid crystal material. When the inside of the chamber is returned to ambient pressure, the liquid crystal material fills the gap. Thereafter, the LC injection port is sealed with epoxy resin (FIG. 2, S109).

Figure 5:
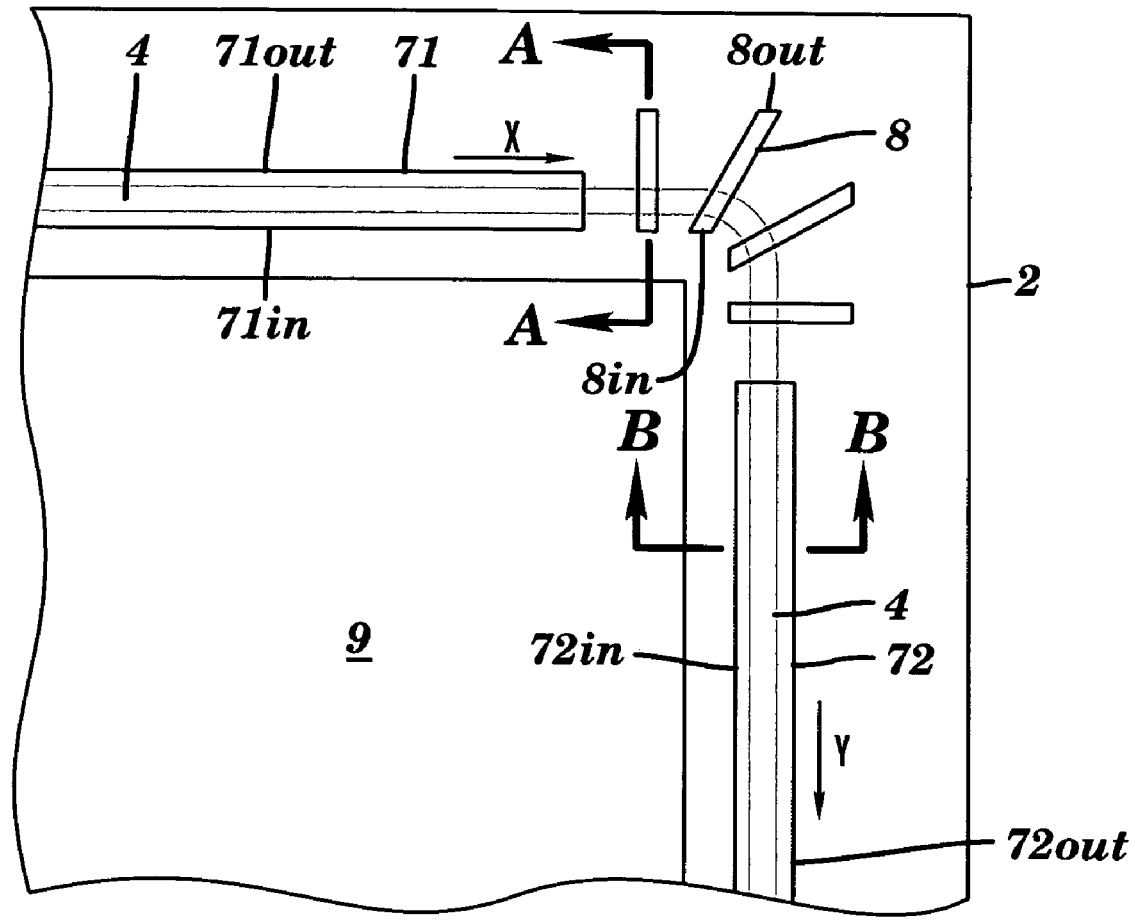
FIG. 5 is a partial view, showing the vicinity of a corner portion of the liquid crystal cell following application of a sealing material.
Figure 6:
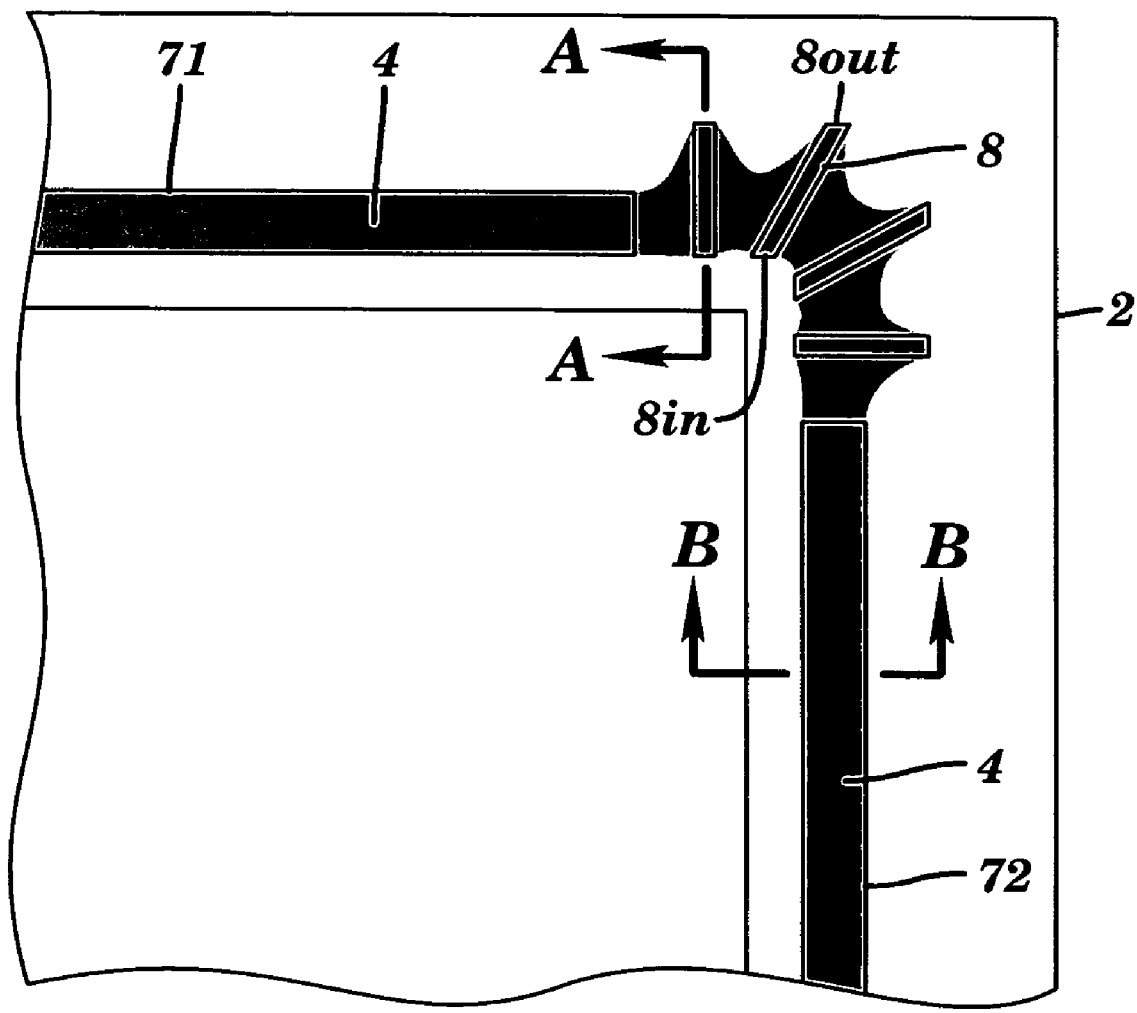
FIG. 6 is a view showing the vicinity of the corner portion in FIG; 5 after the sealing material is pre-baked.
Figure 7:
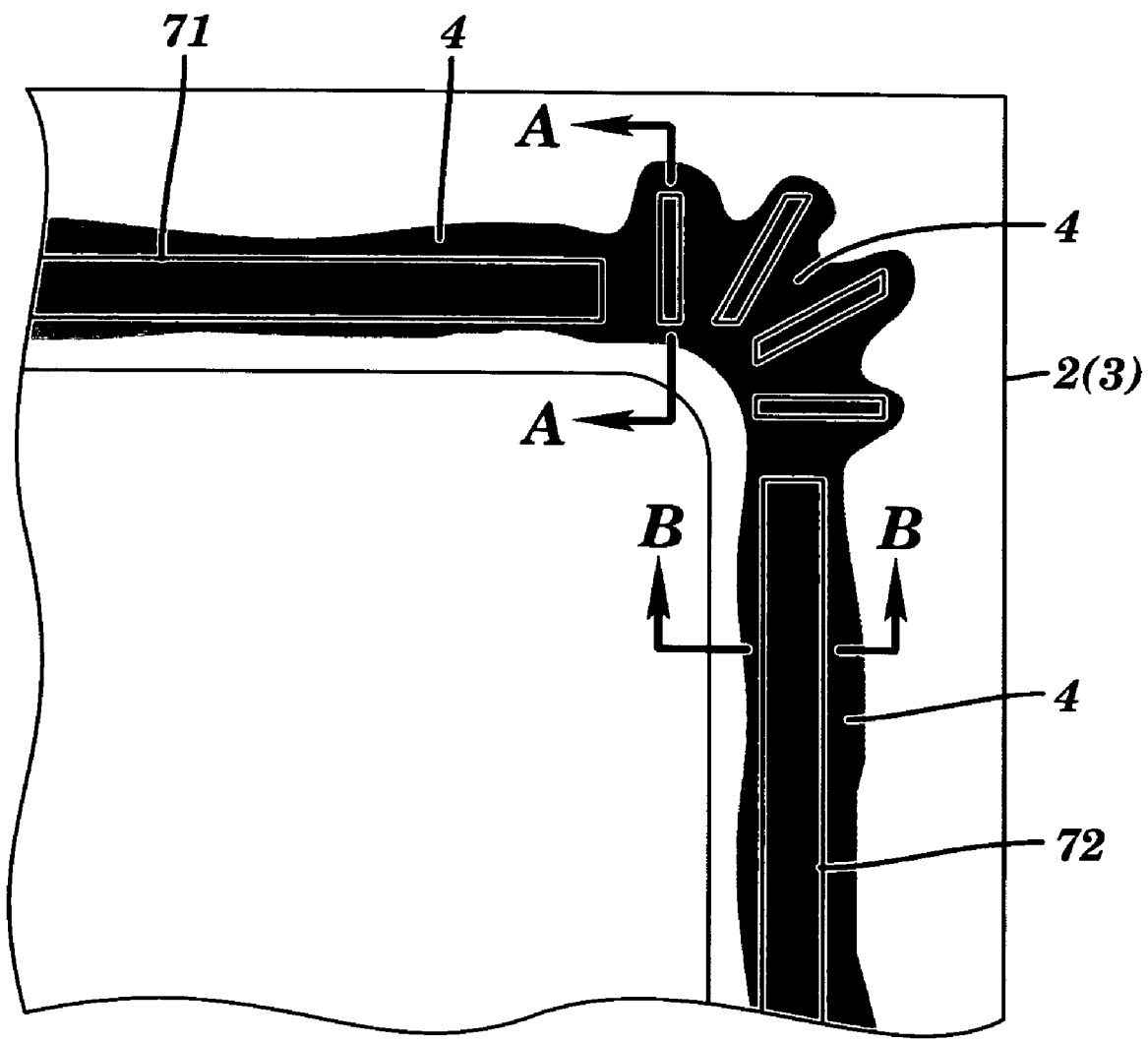
FIG. 7 is a view showing the vicinity of the corner portion in FIG. 6 after a color filter (first) substrate and a TFT array (second) substrate are laminated.

FIGS. 5 to 7 are views for showing behavior of sealing material 4 in the vicinity of the invention's corner portions, wherein FIG. 5 shows a state after sealing material 4 is initially applied, FIG. 6 shows a state after sealing material pre-baking, and FIG. 7 shows a state after the final curing treatment.

Figure 18:
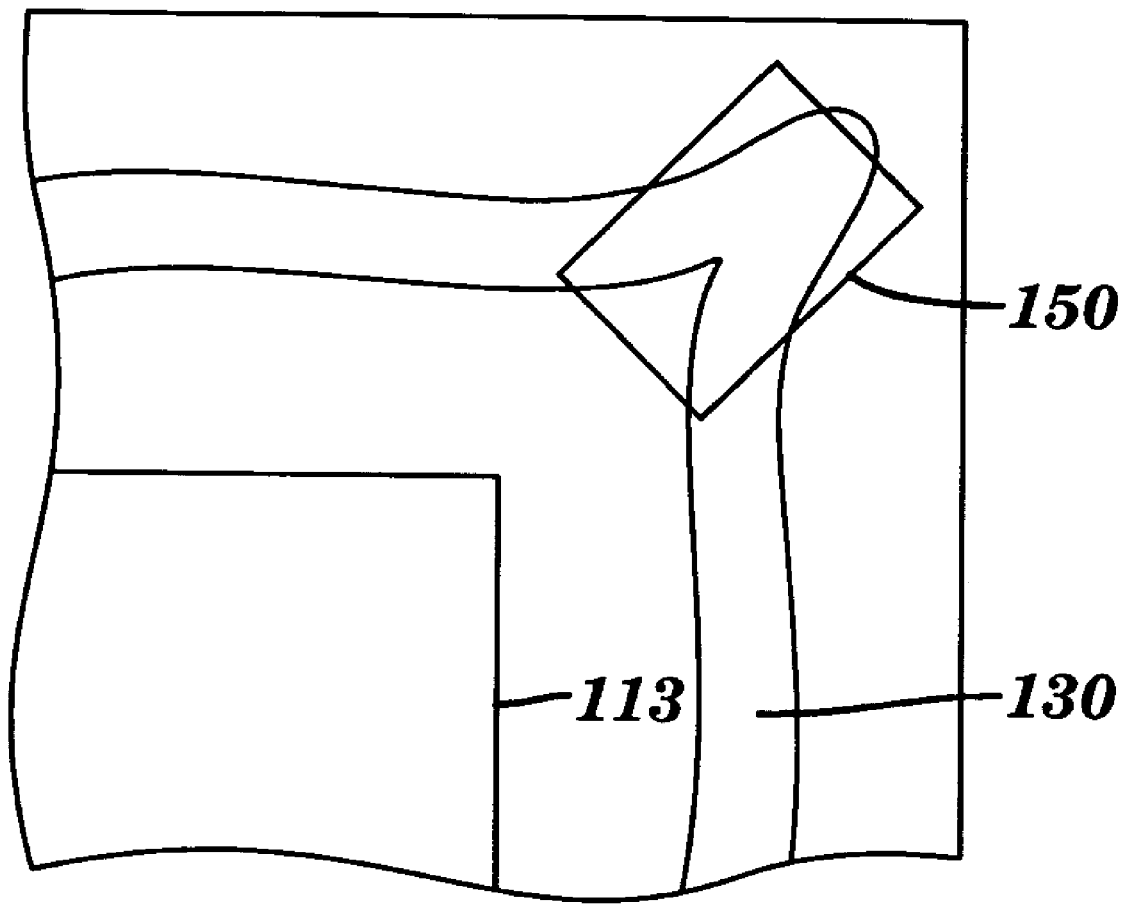

As shown in FIG. 5, sealing material 4 is applied with a dispenser (not shown in FIG. 5, but various types are known, one being illustrated in FIG. 3) from the X direction along (over) first pad 71. In this event, although sealing material 4 is applied onto the corner portion after passing first pad 71, the direction of sealing material 4 dispensing is changed approximately perpendicular at an intersection point with an extension of first pad 72, following which it is applied in the Y direction along (over) first pad 72. This embodiment does not require sealing material 4 to be applied according to a special trajectory such as required in the embodiment in FIG. 18. Of the sealing material 4 as applied in FIG. 5, linear portions along first pads 71 and 72 will be referred to as "edge regions" and the portion of material 4 that connects these edge regions will be referred to as a "corner region". As shown in FIG. 5, sealing material 4 is applied with a width narrower than the corresponding widths of first pads 71 and 72. As previously mentioned, the widths of first pads 71 and 72 are preferably in a range of about 200 to 300 micrometers, for example. In comparison, sealing material 4 is applied to an initial width (as shown in FIG. 5) having a range from about 50 to 70 micrometers, for example. Sealing material 4 is applied on the inside parts of second pads 8 in the corner region, close to the internal edges, as shown. First pads 71 and 72 respectively include inner peripheral edges 71in and 72in that face image display area 9, and outer peripheral edges 71out and 72out that are opposite to inner edges 71in and 72in, respectively. The distances between inner edges 71in and 72in and outer edges 71out and 72out, respectively, constitute the widths W of each of these first pads 71 and 72. In comparison, each of the second pads 8 includes an inner edge 8in that also faces image display area 9, centrally located within the liquid crystal cell. Pads 8 also include an outer edge 8out that is opposite to the inner edge 8in. The distance from inner edge 8in to outer edge 8out constitutes a length L of each second pad 8. As shown in FIG. 5, the widths W of first pads 71 and 72 are less than the length L of second pads 8. Furthermore, outer edges 8out of second pads 8 are located further outward than the extensions of outer peripheral edges 71out and 72out of first pads 71 and 72. Such dimensions, relationships and locations are considered important for proper spreading of sealing material 4 in this embodiment of the invention.

Figure 8A:
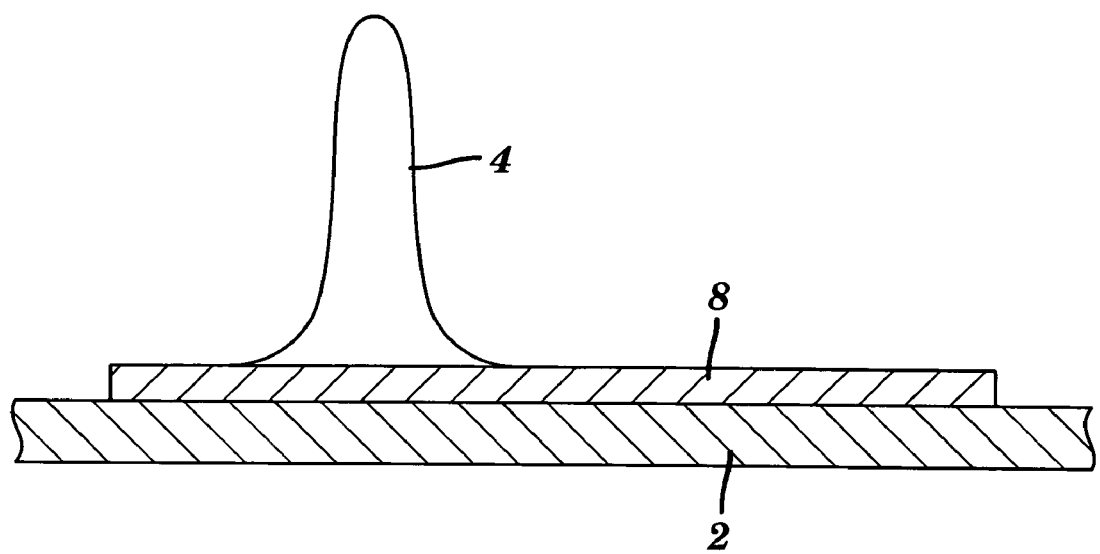
FIG. 8(a) is a cross-sectional view taken along the line A-A of FIG. 5.
Figure 8B:
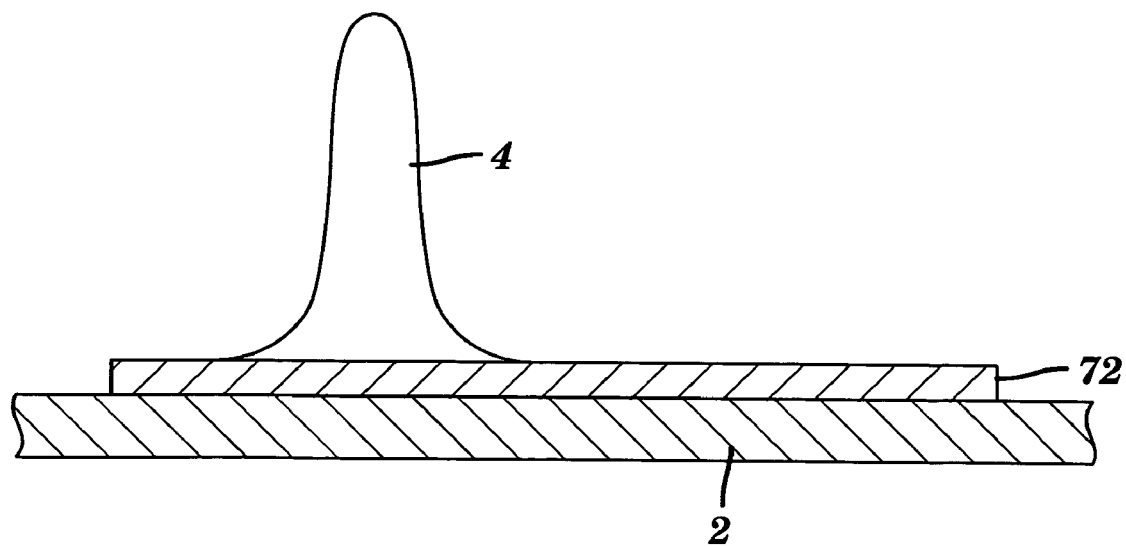
FIG. 8(b) is a cross-sectional view taken along the line B-B of FIG. 5.

Cross-sectional views taken along lines A-A and B-B in FIG. 5 are illustrated in FIGS. 8(a) and 8(b), respectively.

The viscosity of sealing material 4 is reduced when it is pre-baked. Accordingly, sealing material 4 spreads as shown in FIG. 6. Nevertheless, sealing material 4 on first pads 71 and 72 does not spread in excess of the widths thereof, due to the surface tension of the sealing material. Meanwhile, on second pads 8, the sealing material spreads substantially over the full length thereof, from inner edges 8in to outer edges 8out with a reduction of the viscosity. Of significance is that the spread of sealing material 4 occurs to a larger degree at locations between the second pads 8, compared to the spread thereof on the upper surfaces of the second pads. This is because the width of second pads 8 are narrower than the width between second pads 8, and the sealing material 4 will tend to spread towards the longitudinal directions of respective second pads 8 under influence of the surface tension of the sealing material. This embodiment assures sealing material 4 applied onto the corner portion will be spread more toward the outside direction of color filter substrate 2, thus inhibiting sealing material 4 from spreading toward the inside of the substrate and causing problems such as described hereinabove with respect to other known structures.

Figure 9A:
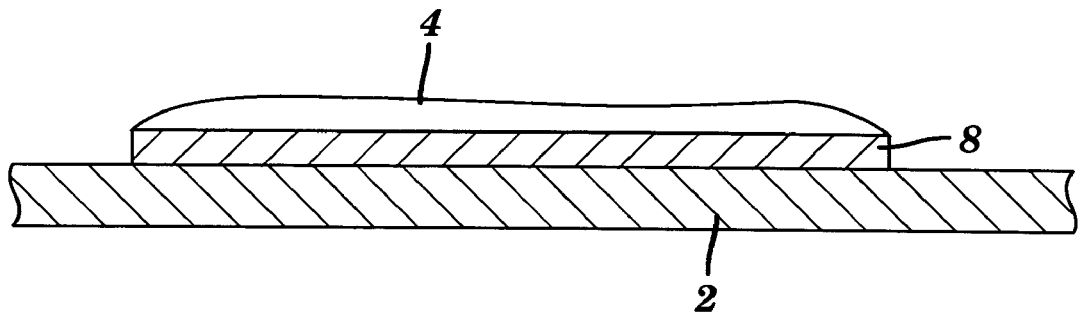
FIG. 9(a) is a cross-sectional view taken along the line A-A of FIG. 6.
Figure 9B:
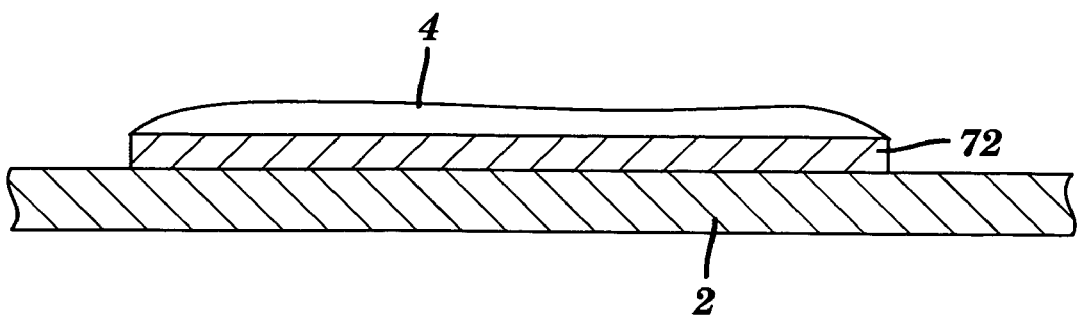
FIG. 9(b) is a cross-sectional view taken along the line B-B of FIG. 6.

Cross-sectional views taken along line A-A of FIG. 6 and line B-B thereof are illustrated in FIGS. 9(a) and 9(b), respectively. It is noted that the thicknesses of material 4 in both FIGS. 9(a) and 9(b) are substantially the same.

The state of the structure in FIGS. 5 and 6 after the curing treatment is shown in FIG. 7. Due to lamination of color filter substrate 2 and TFT array substrate 3, sealing material 4 spreads more than shown in FIG. 6 to the extent that it fully surrounds second pads 8. Significantly, while sealing material 4 spreads more toward the outside direction of color filter substrate 2 at this corner portion, adhesive spreading toward the inside direction is inhibited. The state as illustrated in FIG. 7 is attributed to spreading of sealing material 4 on second pads 8 toward the outside direction of color filter substrate 2 upon pre-baking, due to the surface tension thereof. In addition, a gap between an upper surface of second pads 8 and TFT array substrate 3 is smaller than a gap between a portion of the substrate's corner without second pads 8 and the adjacent TFT array substrate 3. Accordingly, the capillary phenomenon between the upper surfaces of second pads 8 and TFT array substrate 3 during laminating color filter substrate 2 to TFT array substrate 3 causes sealing material 4 present in that space to spread toward the outside direction. Furthermore, by providing a plurality of second pads 8 in the orientation described and shown in this embodiment, sealing material 4 is filled between second pads 8. As a result, adhesion between color filter substrate 2 and TFT array substrate 3 is enhanced.

Figure 10A:
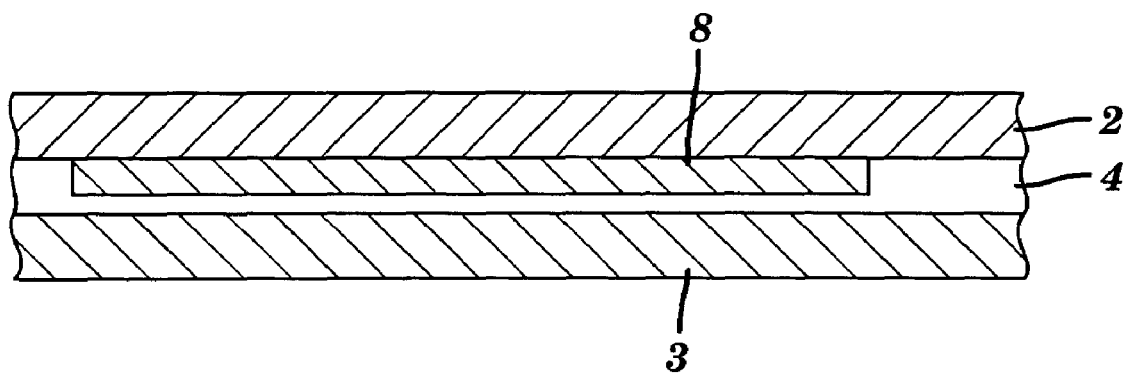
FIG. 10(a) is a cross-sectional view taken along the line A-A of FIG. 7.
Figure 10B:
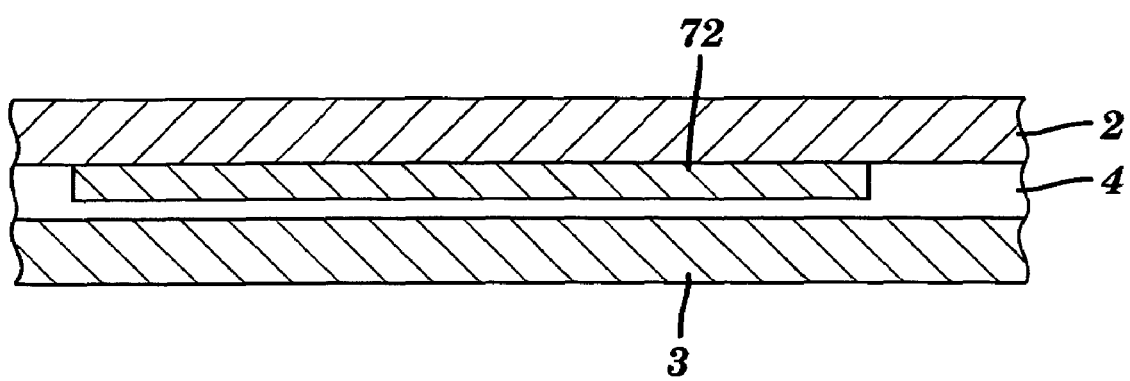
FIG. 10(b) is a cross-sectional view taken along the line B-B of FIG. 7.

Cross-sectional views taken along line A-A of FIG. 7 and line B-B thereof are illustrated in FIGS. 10(a) and 10(b), respectively. The structures in FIGS. 10(a) and 10(10b) are inverted compared to the plan view in FIG. 7. That is, substrate 2 is shown over substrate 3, with pads 8 and 72 secured to (or part of) the upper substrate.

Figure 11A:
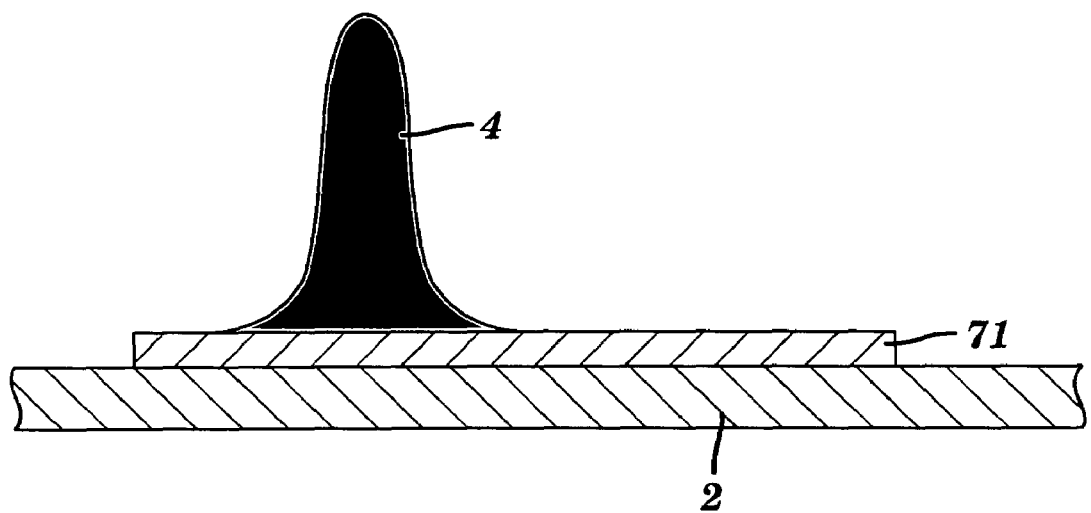
FIGS. 11 (a) and 11(b) are before and after views illustrating sealing material on a first pad.
Figure 11B:
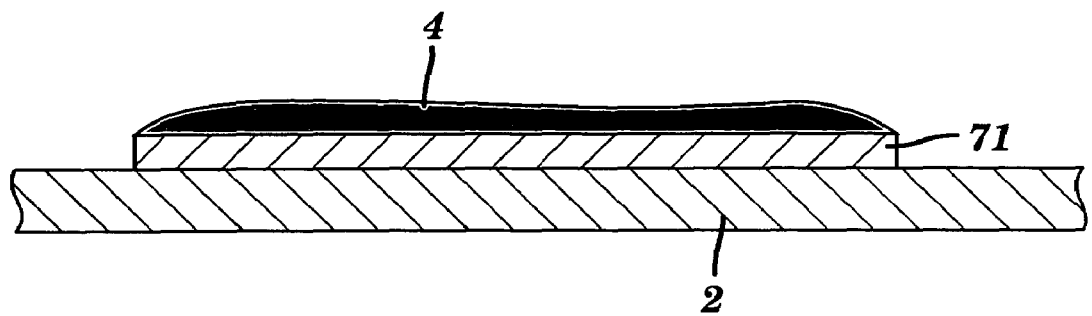
Figure 12A:
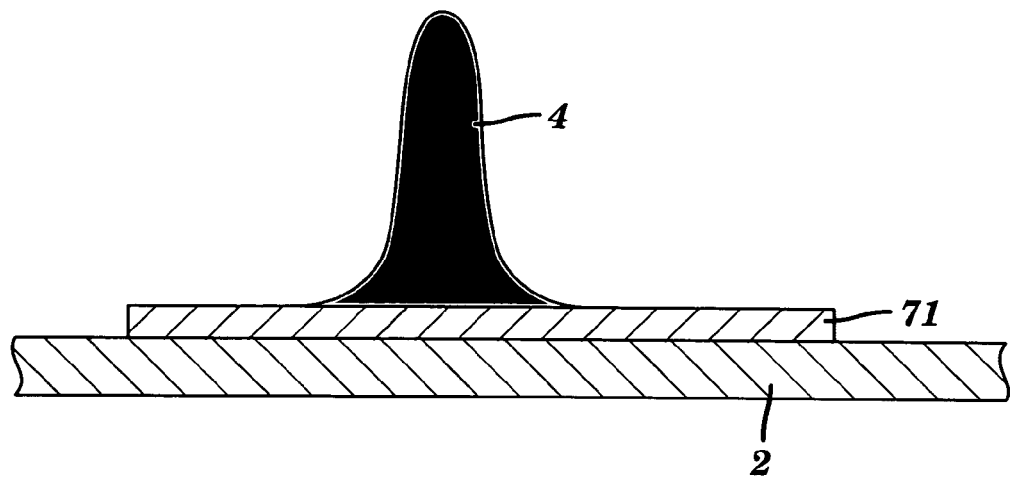
FIGS. 12(a) and 12(b) are other before and after views illustrating sealing material on a pad.
Figure 12B:
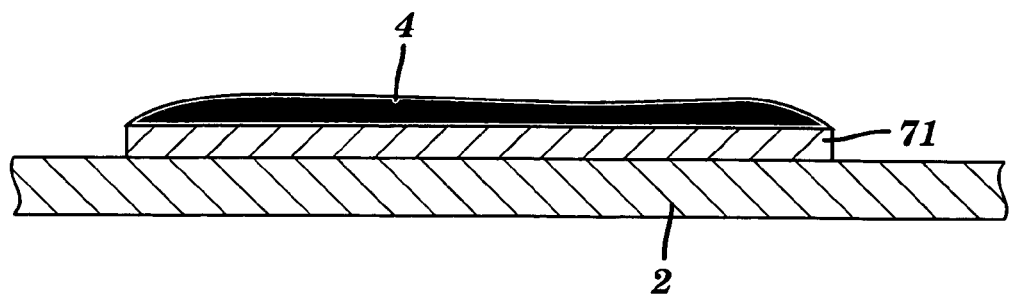
Figure 13A:
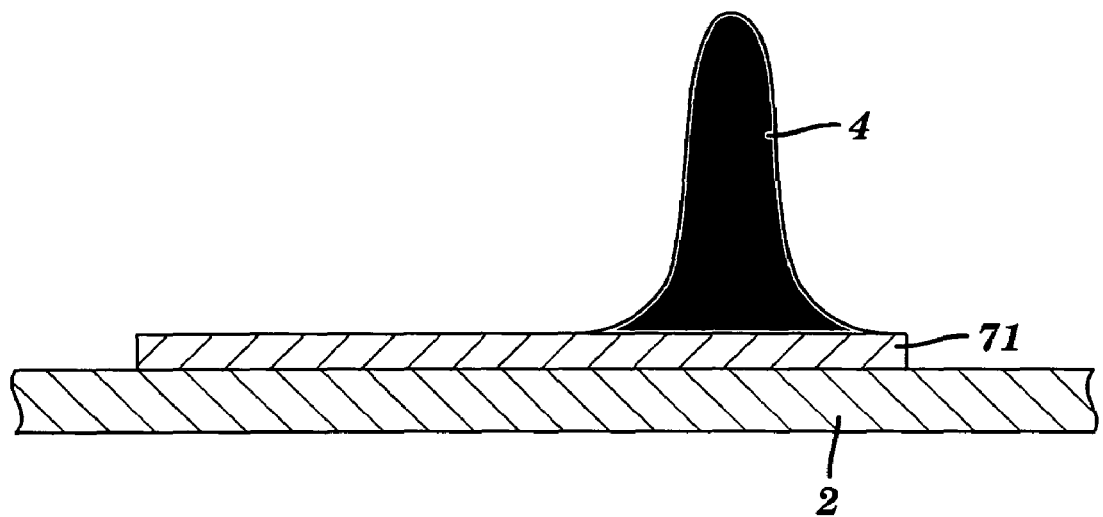
FIGS. 13(a) and 13(b) are other before and after views illustrating sealing material on a pad.
Figure 13B:
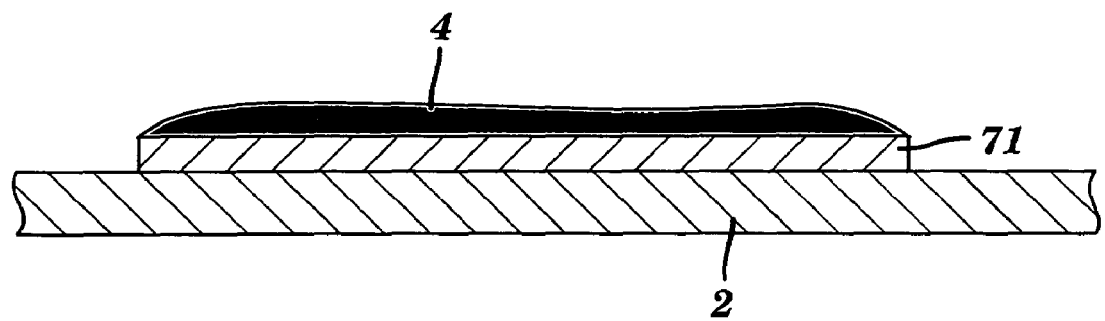

First pads 71-74 have two functions. One is a positioning function for sealing material 4. Sealing material 4 is required to be applied precisely on a predetermined location of pads 71-74. Notwithstanding improvement in application precision with known dispensers, such precision may fluctuate due to various factors. First pads 71-74 must also function to accommodate for such dispensing fluctuations. FIGS. 11-13 illustrate this capability. Specifically, FIGS. 11-13 illustrate cases in which sealing material 4 is applied more toward the left side, at the center, or more toward the right side of first pad 71, respectively. FIGS. 11(a), 12(a) and 13(a) show states immediately after sealing material application, while FIGS. 11(b), 12(b) and 13(b) show states after pre-baking, respectively.

As shown in FIGS. 11(a) and 11(b), if sealing material 4 is applied more on the left side of first pad 71, the sealing material spreads entirely over the width direction of the first pad after pre-baking. Similarly, when sealing material 4 is applied at the center of first pad 71, the sealing material also spreads entirely over the width direction of the first pad after pre-baking. Finally, if sealing material 4 is applied more on the right side of first pad 71, the sealing material still spreads entirely over the width direction of the first pad after the pre-baking step. Significantly, sealing material 4 does not spread beyond the width of pad 71 after pre-baking. Thus, precise material positioning is assured by the pad designs shown and defined herein.

Another function of pads 71-74 is to reduce the pressed amount of sealing material 4 at the corner portion. In the corner portion (except for the portions on second pads 8), sealing material 4 has less height over pads 71-74, which height is lowered by the heights of these first pads. Accordingly, the pressed amount of sealing material 4 in the corner portion (except for the portions on second pads 8) becomes less when color filter substrate 2 and TFT array substrate 3 are laminated together. This aspect provides inhibition of spreading of sealing material 4 at the corner portion. In order to assure this, the embodiments defined above utilize the plurality of second pads 8 formed with predetermined spaces therebetween. If pads 71 and 72 are extended and connected to each other at the corner portion, rather than discontinued as shown, this will not reduce the pressed amount of sealing material 4 at the corner portion.

Figure 14:
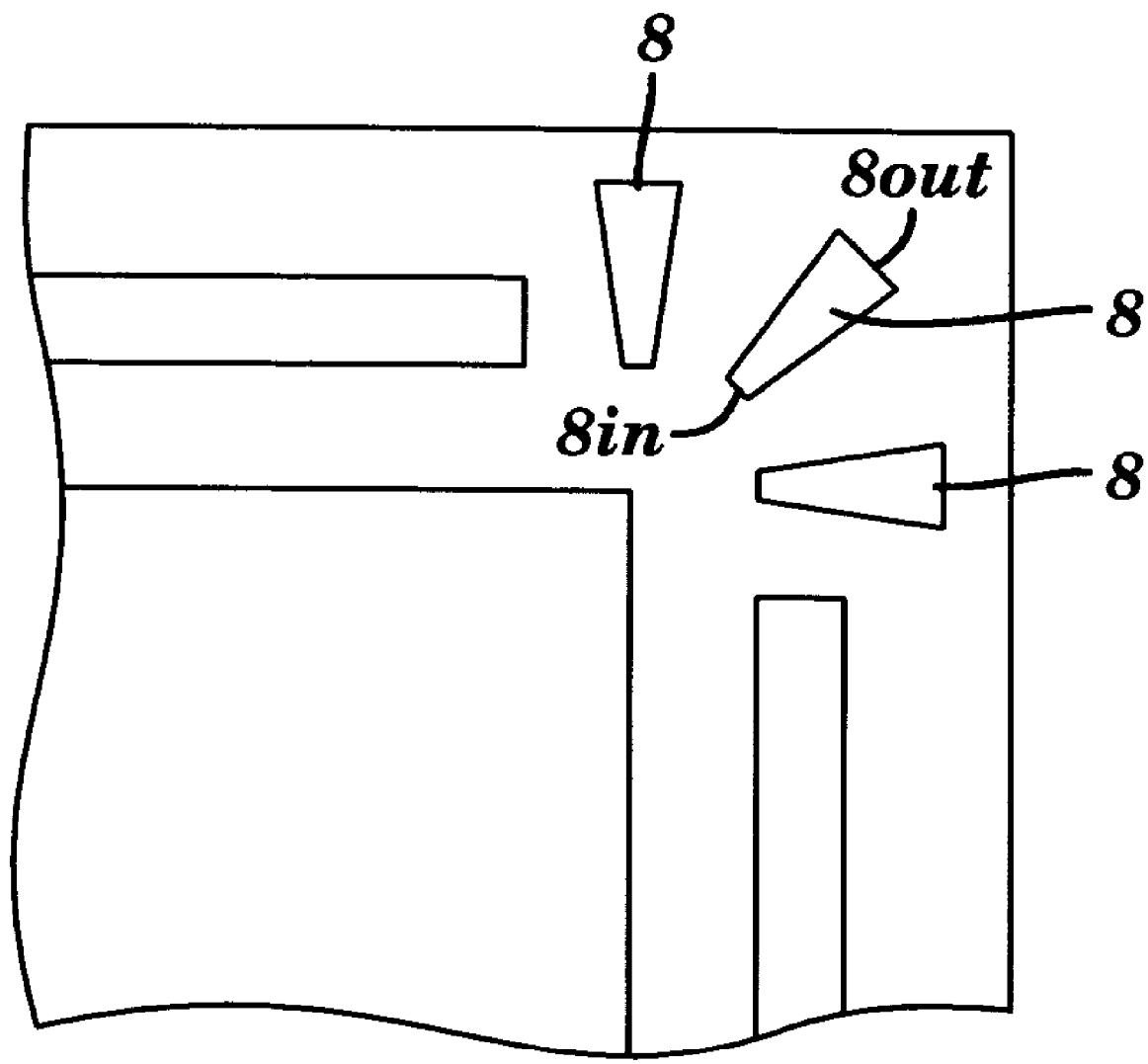
FIGS. 14 and 15 represent examples of pad configurations and orientations according to one embodiment of the invention.

FIG. 14 shows an alternative embodiment of the invention. The second pads 8 of FIG. 14 are also planar in cross-section (as are pads 8 defined above), but in FIG. 14, the pads are also shown as being of a tapered shape. These second pads can retain more sealing material 4 on the outer portions. This assures reduction of the amount of sealing material 4 at inner edge 8in, thus effectively preventing sealing material from spreading toward the interior of the liquid crystal cell.

Figure 15:
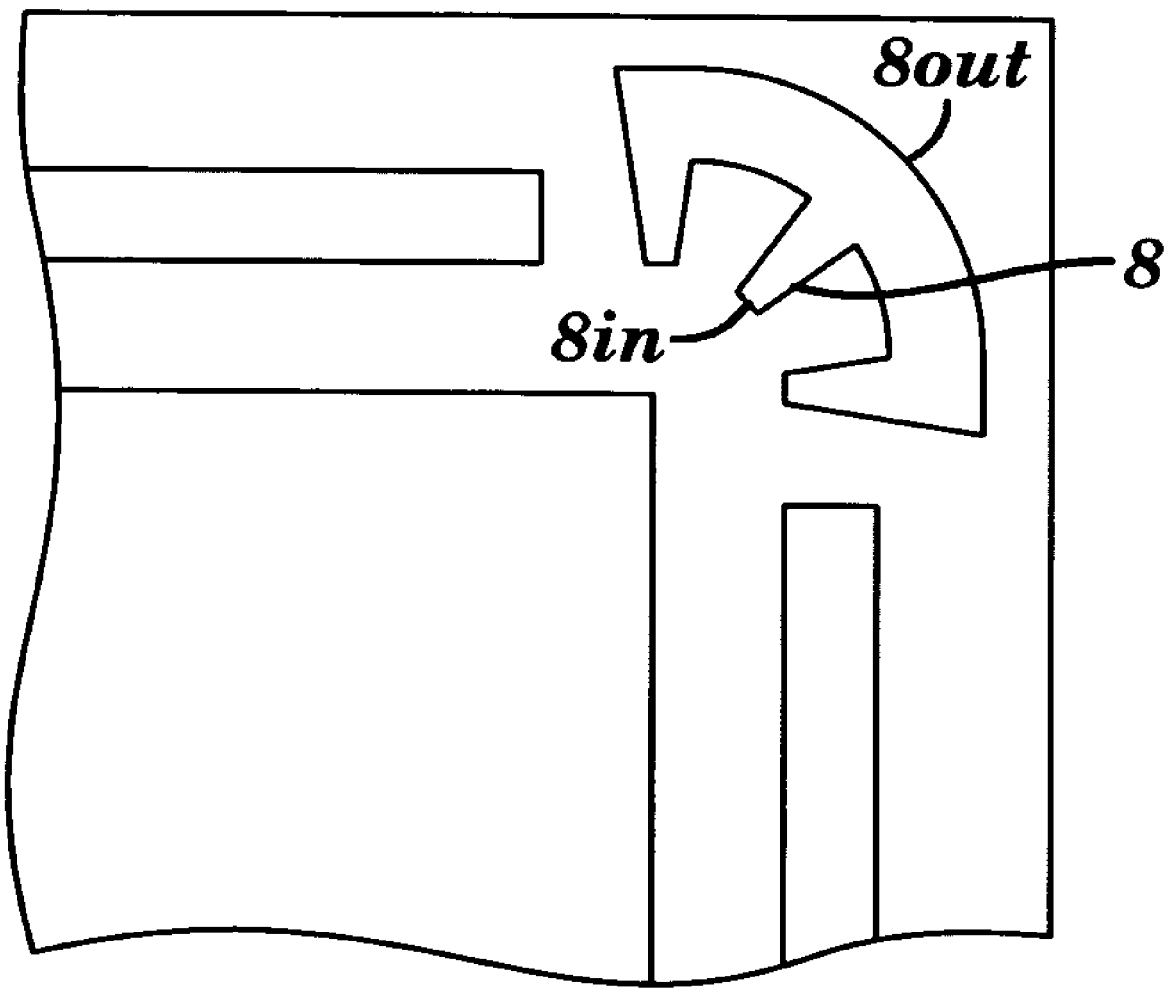
Figure 16C:
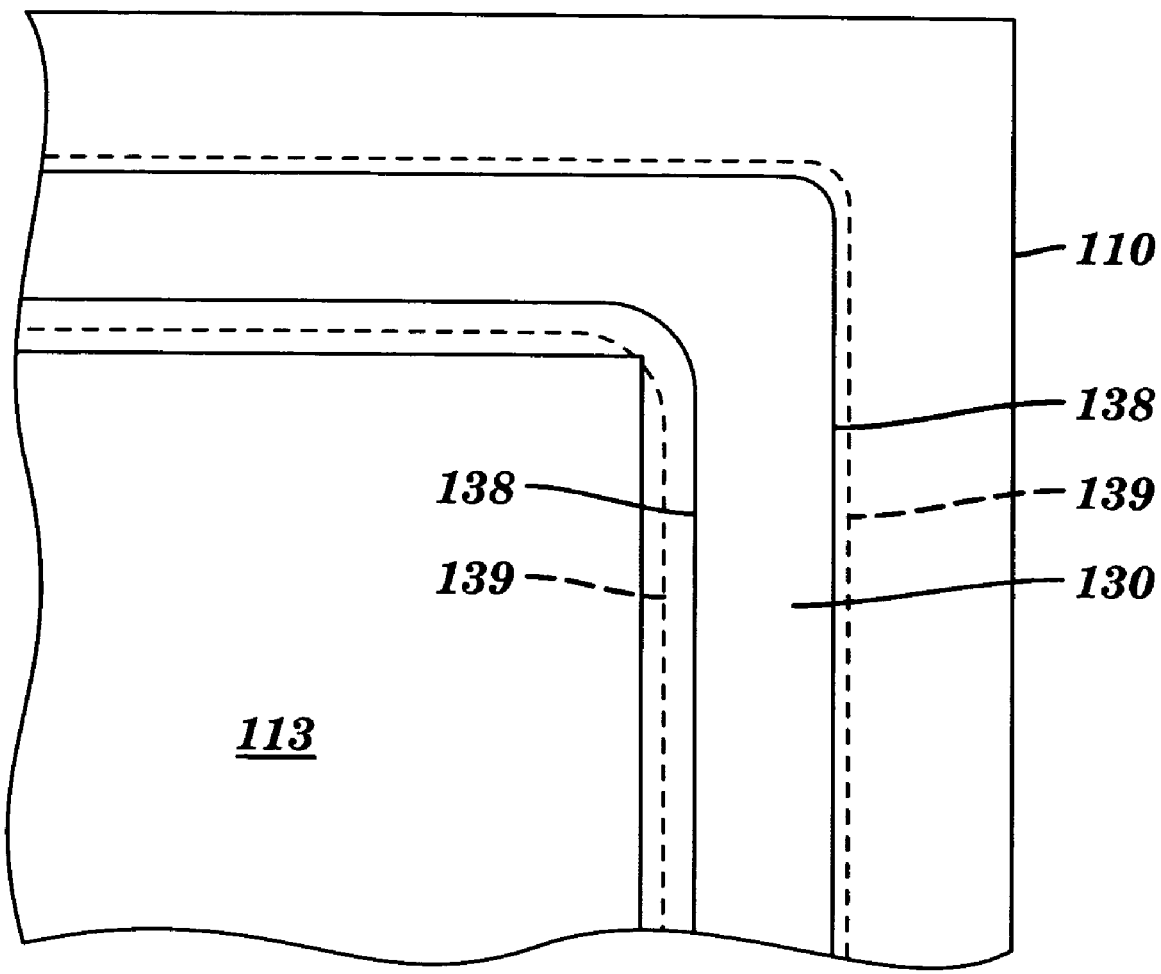
Figure 17:
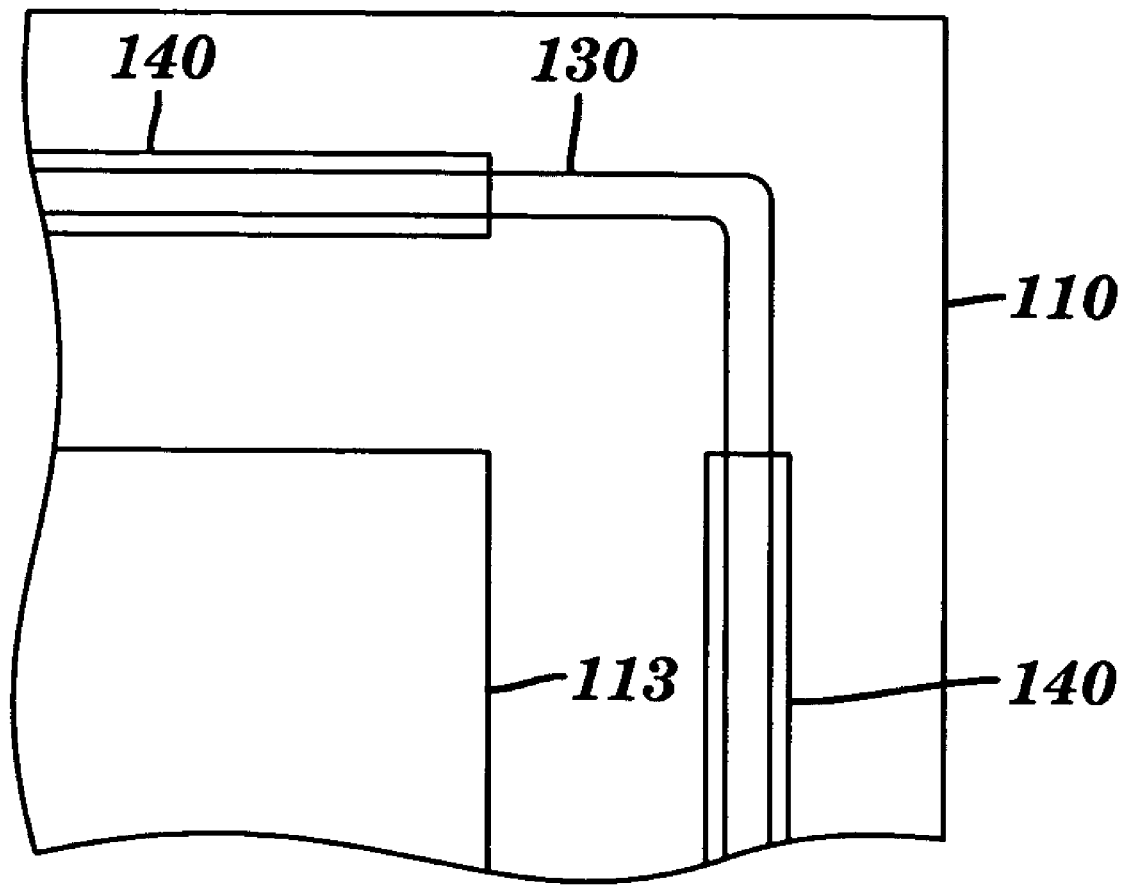

FIG. 15 shows another embodiment of the invention. In this design, the outer edges 8out of second pads 8 are joined to form a singular curved outer edge for all three pad inwardly protruding ends. The design of FIG. 15 enables more sealing material to spread toward the outside of the substrate's corner portion (and thus away from the interior thereof).

Although the present invention has been described based on the foregoing embodiments, it should be understood that the present invention is not limited by the embodiments described and shown herein. For example, the present invention is universally adoptable to laminated substrates other than liquid crystal cells. Furthermore, although epoxy resin was used in the embodiments as a preferred example of a sealing material. Other materials, e.g., an ultraviolet-setting resin are also possible. If an ultraviolet-setting resin is used, is possesses a low viscosity at the time of application, and can spread on the first pads and the second pads without pre-baking.

As described above, the present invention provides a laminated substrate capable of controlling behavior of a sealing material more effectively at corner portions thereof. This is possible without requiring a special trajectory for the material dispenser during application of the sealing material.

While there have been shown and described what are at present the preferred embodiments of the invention, it will be obvious to those skilled in the art that various changes and modifications may be made therein without departing from the scope of the invention as defined by the appended claims.

What is claimed is:

1. A liquid crystal cell comprising:
a substantially rectangular first substrate having a color filter layer and four corner portions;
a substantially rectangular second substrate being disposed opposite to said first substrate and having driver elements for liquid crystal materials;
a sealing material of a frame shape for joining said first substrate and said second substrate; and
a plurality of pads having a tapered shape positioned on each of said corner portions of said first substrate or forming a part of said first substrate, said pads oriented in a substantially radial pattern in said corner portions.

2. The liquid crystal cell according to claim 1, wherein said pads are each comprised of the same material as said color filter layer.

3. The liquid crystal cell according to claim 1 further including another plurality of pads, each of said another plurality of pads being oriented along a side portion of said first substrate.

4. The liquid crystal cell according to claim 1 wherein the number of pads positioned on each of said corner portions or forming part of said first substrate is four.

5. The liquid crystal cell according to claim 1 wherein each of said pads positioned on said corner portion is of substantially rectangular configuration.

6. The liquid crystal cell according to claim 1 wherein said pads positioned on said corner portion include a common outside edge.

* * * * *